United States Patent [19]
Konrad

[11] Patent Number: 4,791,716
[45] Date of Patent: Dec. 20, 1988

[54] METHOD AND APPARATUS FOR SECURING A CONNECTOR TO A PIPE

[75] Inventor: Mathias Konrad, Lohmar, Fed. Rep. of Germany

[73] Assignee: Jean Walterscheid GmbH, Fed. Rep. of Germany

[21] Appl. No.: 31,993

[22] Filed: Mar. 27, 1987

[30] Foreign Application Priority Data

Mar. 27, 1986 [DE] Fed. Rep. of Germany ....... 3610427

[51] Int. Cl.$^4$ ............................................. B23P 19/04
[52] U.S. Cl. ......................................... 29/520; 29/237
[58] Field of Search .......................... 29/237, 516, 520; 285/382.7

[56] References Cited

U.S. PATENT DOCUMENTS

| | | |
|---|---|---|
| 3,201,859 | 8/1965 | Stanley ............................. 29/237 X |
| 3,773,169 | 11/1973 | Zahuranec et al. ............... 29/237 X |
| 3,972,112 | 8/1976 | O'Sickey et al. ................. 29/520 X |
| 4,076,286 | 2/1978 | Spontelli .......................... 29/520 X |
| 4,298,222 | 11/1981 | Davies ............................ 285/382.7 X |
| 4,568,114 | 2/1986 | Konrad ........................... 285/382.7 X |

FOREIGN PATENT DOCUMENTS 1844482 10/1961 Fed. Rep. of Germany .
2552648 5/1976 Fed. Rep. of Germany .
1957565 11/1976 Fed. Rep. of Germany .

OTHER PUBLICATIONS

Hydraulic Tube Fittings-SAE J514, Apr. 80, pp. 19.46 & 19.54.

Primary Examiner—Timothy V. Eley
Assistant Examiner—Frances Chin
Attorney, Agent, or Firm—Toren, McGeady & Associates

[57] ABSTRACT

The securing and sealing of a connector 10 to a pipe 12 for a hydraulic connection comprises a pre-assembly step wherein a cutting/clamping ring 34 is secured to the pipe and a final assembly step wherein the ring 34 is sealed to a connector body 14. The axial force applied by a nut 20 to the ring 34 during the final assembly step is less than the axial force applied to the ring 34 during the pre-assembly step whereby no further cutting of the teeth 40 into the pipe is permitted but sealing takes place between cooperating conical surfaces 22 and 36 of the connector body and cutting/clamping ring respectively.

1 Claim, 1 Drawing Sheet

METHOD AND APPARATUS FOR SECURING A CONNECTOR TO A PIPE

BACKGROUND TO THE INVENTION

1. Field to the Invention

This invention relates to a method and apparatus for securing a connector to a pipe for establishing a sealed connection between the pipe and the connector.

Typically, such a connection will be established between a relatively thin walled metal pipe and a connector for use in a high pressure hydraulic circuit.

2. Description of Prior Art

One method of securing a collector to a pipe is disclosed in DE No. 19 57 565 which teaches the use of a pre-assembly step and a final assembly step wherein, during the pre-assembly step, a clamping ring having radially inwardly directed cutting teeth is located around an end portion of a pipe and is then pressed into a bush provided with an inner conical surface with an axial force imparted to the clamping ring by hydraulic means. In this patent specification, the hydraulically applied axial force is pressure limited by a valve and, for each diameter of pipe, a special die insert is provided which also serves as an adjustment means for the hydraulic pressure limitation. The purpose of this arrangement is that the pre-assembly force is adaptable to the respective pipe diameter and thus to the size of the clamping ring.

A disadvantage of this arrangement is that there is no certainty that the clamping ring teeth will be brought into complete cutting engagement with the pipe during the pre-assembly step whereby, during the final assembly of the connector to the pipe, undefined further cutting of the clamping ring teeth into the pipe may take place together with radially inward deformation of the pipe. Thus there is no certainty that the engagement between the clamping ring teeth and the pipe will be sufficient to resist axial pull-out of the pipe from the clamping ring after final assembly of the connector especially during pulsed hydraulic loads within the hydraulic circuit.

SUMMARY OF THE INVENTION

It is an object of the present invention to provide a method and apparatus of securing a connector to a pipe which will ensure sufficient engagement of the connector with the pipe to resist axial pull-out loads of the pipe from the connector whilst permitting of the application of lower tightening forces applied to the connector during its final assembly to the pipe than in the case of prior art arrangements.

In accordance with one aspect of the invention there is provided a method of securing a connector to a pipe wherein the connector comprises a body having a frusto conical entry bore, a clamping ring having radially inwardly directed cutting teeth for engaging the pipe and having an outer frusto conical surface sealingly engageable with the entry bore of the body, and a retainer ring engageable with the body and the clamping ring for securing the pipe to the body; the method comprising a pre-assembly step and a final assembly step wherein, during the pre-assembly step, the clamping ring pressed axially into a frusto conical entry bore of a pre-assembly body member with an axial force sufficient to force the teeth of the clamping ring into cutting engagement with the pipe and wherein, during the final assembly step, the pipe and attached clamping ring are engaged within the entry bore of the connector body and an axial force is applied to the clamping ring by engagement of the retainer ring with the body which is less than the axial force applied to the clamping ring during the pre-assembly step whereby further cutting of the clamping ring teeth into the pipe is prevented but wherein radially inward deformation of the pipe is permitted.

Also an accordance with the invention there is provided apparatus for carrying out the method as described in the preceding paragraph wherein, for the pre-assembly step, there is provided the pre-assembly body member having a said frusto conical entry bore, a cylindrical bore extending therefrom into the body member to receive an end of the pipe and an annular stop shoulder for abutment by the end of the pipe; and wherein, for the final assembly step, the connector has the frusto conical entry bore, a cylindrical bore extending wherefrom into the body to receive an end of the pipe extending axially beyond the clamping ring and an annular stop shoulder for abutment by the end of the pipe.

For the pre-assembly step, the pipe is conveniently internally supported against radially inward deformation, preferably by means of a cylindrical journal engageable in the pipe for supporting the pipe against radially inward deformation during the forcing of the clamping ring teeth into cutting engagement with the pipe. Such cylindrical journal may be hollow and may comprise a plurality of axially extending fingers providing a cylindrical outer surface, the fingers being displaceable radially upwardly by a mandrel movable axially within the journal to force the ringers into firm supporting engagement with the interior of the pipe during the said pre-assembly step.

In one relationship between the pre-assembly body member and the connector body, the angle of conicity of the entry bore of the pre-assembly body member is substantially identical with the angle of conicity of the entry bore of the connector body and the diameter of the pre-assembly body member entry bore is greater than the diameter of the connector body entry bore.

In an alternative relationship, the axial distance from the entry end of the entry bore of the pre-assembly body member to the stop shoulder thereof is less than the corresponding axial distance from the entry end of the entry bore of the connector body to the stop shoulder thereof.

Also, is accordance with the invention, there is provided a connection between a connector and a pipe whenever produced by the method or apparatus as described in the preceding paragraphs.

BRIEF DESCRIPTION OF DRAWINGS

Other features of the invention will become apparent from the following description given herein solely by way of example with reference to the accompanying drawings wherein.

DESCRIPTION OF PREFERRED EMBODIMENTS

Figure 2:
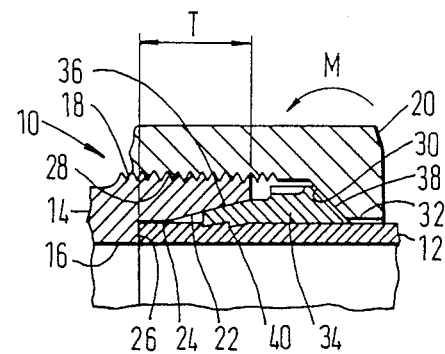
FIG. 2 is a side cross sectional view of a connector as used in the final assembly step of the invention.

Referring firstly to FIG. 2 of the drawings, there is shown a connector 10 secured to a pipe 12 which, typically, may be a relatively thin walled metal pipe for use in a hydraulic circuit. The connector comprises a connector body 14 having a cylindrical inner bore 16 and an outer screw threaded cylindrical surface 18 for engagement by an annular retainer ring 20 in the form of a nut. The connector body 14 includes a frusto conical entry bore 22 with a cylindrical bore 24 extending axially therefrom into the connector body and terminating at an annular stop shoulder 26 extending radially between the inner bore 16 and the cylindrical bore 24. As shown in FIG. 2, the axial distance from the entry end of the entry bore 22 to the annular stop shoulder 26 is indicated by the letter T.

The nut 20 includes an internally threaded cylindrical bore 28 for engagement with the threaded outer surface 18 of the body 14 which bore 28, at its axially inner end, terminates in an unthreaded frusto conical bore 30 extending to an unthreaded cylindrical bore 32 which is of a diameter slightly greater than the external diameter of the pipe 12 which is to be secured to the connector 10.

A clamping ring 34 is retained between the nut 20 and the connector body 14 and such ring, in its outer surface, includes a leading frusto conical surface 36 of the same angle of conicity as the frusto conical entry bore 22 of the body 14 and a trailing frusto conical surface 38 of the same angle of conicity is the frusto conical bore 30 of the nut 20. The radially inner surface of the clamping ring 34 is provided with a plurality of radially inwardly extending cutting teeth 40 which, as shown in FIG. 2, are cuttingly engaged into the pipe 12.

Figure 1:
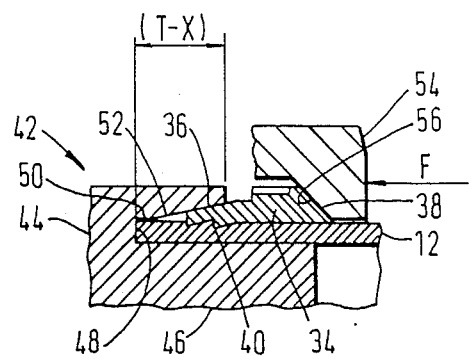
FIG. 1 is a side cross sectional view of a pre-assembly member as used in the pre-assembly step of the invention.

Referring now to FIG. 1, there is shown a pre-assembly device 42 whereby the clamping ring 34 is firmly securable to the pipe 12. The pre-assembly device includes a pre-assembly body member 44 having a cylindrical axially projecting journal 46 closely engageable within the end of the pipe 12. Said journal 46, at its axially inner end, is spaced be an annular stop shoulder 48 extending radially from the outer surface of the journal to a further cylindrical surface to define a cylindrical bore 50 for receiving an end of the pipe. A frusto conical entry bore 52 extends from the axially outer end of the bore 50 to the entry end of the body member 44; the angle of conicity of the entry bore 52 being equal to that of the leading frusto conical surface 36 of the clamping ring 34.

A force applying member 54 which includes an inner frusto conical surface 56 having an angle of conicity equal to that of the trailing frusto conical surface 38 of the clamping ring 34 is engageable with the clamping ring. In accordance with the invention, a pre-assembly step in securing the connector 10 to the pipe 12 comprises assembling the clamping ring 34 around an end of the pipe and then applying an axial force to the clamping ring 34 by any suitable force applying means (hydraulic, pneumatic or mechanical) applied to the member 54 thereby to cause the cutting teeth 40 of the clamping ring 34 to cut into the outer surface of the pipe 12 whilst it is supported against radially inward deformation by the journal 46.

It will be noted that, in the pre-assembly body member 44 shown in FIG. 1, the axial distance from the entry end of the entry bore 52 to the annular stop shoulder 48 is shown as T - X. Thus, during the pre-assembly step, the axial force F applied to the clamping ring 34 causes radially inward cutting movement of the cutting teeth 40 into the pipe 12 whilst the end of the pipe is abutted against the annular stop shoulder 48 with the penetration distance of the pipe into the body member 44 being equal to the distance T - X.

After the pre-assembly step has been completed, the pipe with its attached clamping ring is then inserted within the connector body 14 and the nut 20 screwed onto the body to constitute the final assembly step. However, since the distance T is greater than the distance T - X, it will be appreciated that tightening of the nut 20 onto the connector body 14 will only provide sealing engagement between the leading frusto conical surface 36 of the clamping ring 34 and the connector body entry bore 22 without causing further cutting of the cutting teeth 40 into the pipe although radially inward deformation of the pipe may be permitted as there is no internal support therefor. Thus the nut 20 may be tightened to the position shown in FIG. 2 at which time the end of the pipe is in abutment against the annular stop shoulder 26 the operative of the connector body 14 and, at this time will experience a substantial resistance to further tightening indicating that sealing is complete. However, during such tightening, and in accordance with the invention, the axial force applied by the nut 20 to the clamping ring 34 through engagement of the frusto conical surface 30 of the nut with the trailing frusto conical surface 38 of the clamping ring will be substantially less than the axial force applied to the clamping ring during the pre-assembly step shown in FIG. 1.

In other words, the residual axial distance X which is provided in the connector body 14 for the final can be accurately defined by the appropriate relative dimensions between the body 14 and the pre-assembly body member 44 thus enabling a limiting of the axial force applied by the nut 20 during the final assembly step to the establishment of a sea between the clamping ring 34 and the entry bore 22 of the connector body. Consequently, the method step of establishing the cutting teeth connection of the clamping ring to the pipe (the pre-assembly step) is separate from the establishment of the sealing connection between the clamping ring and then connector body (the final assembly step).

Figure 3:
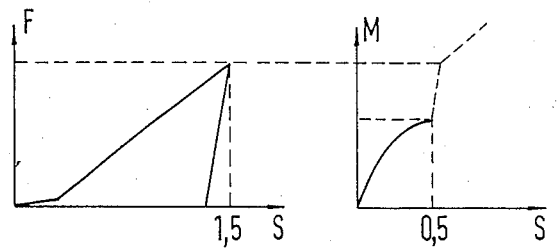
FIG. 3 shows a graphs of axial force plotted against distance during the pre-assembly step and tightening torque plotted against distance during the final assembly step of the invention.

Referring now to FIG. 3, the left-hand graph plots the axial force F against the axial distance S of the clamping ring 34 as it is inserted into the pre-assembly body member 44, such distance S being expressed in terms of number of revolutions of the nut 20 utilised in the final assembly step. A corresponding graph is shown at the left-hand side of FIG. 4 in respect of a pre-assembly step used in prior art methods from which it will be seen that the axial force F applied during the pre-assembly step of the present invention is considerably higher than that of the prior art to give a corresponding greater number of equivalent revolutions of the nut i.e. the axial distance of penetration of the clamping ring 34 into the pre-assembly body member 44 is increased in comparison with the prior art.

Figure 4:
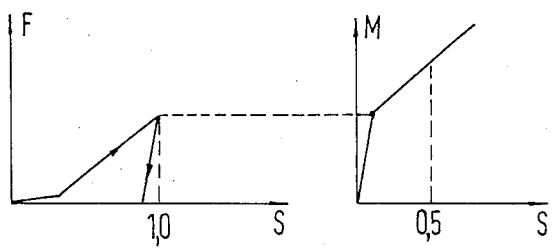
FIG. 4 shows graphs similar to those of FIG. 3 during pre-assembly and final assembly steps of prior art methods.

The right-hand graphs in FIGS. 3 and 4 are plots of nut tightening torque M again against distance S represented by the number of revolutions of the nut 20. From the right-hand graph of FIG. 3 it will be seen that, during the final assembly step, up to the point of contact between the end of the pipe 12 and the annular stop shoulder 48, the tightening torque is curvilinear and results from the friction between the leading frusto conical surface 36 of the clamping ring 34 and the corresponding inner conical surface of the entry bore 22 of the connector body 14. When the end of the pipe 12 comes into abutment with the annular stop shoulder 26 the tightening torque rises sharply as is shown by the rising dotted line in the right-hand graph of FIG. 3 and, as mentioned hereinbefore, the operative then recognizes immediately that the final assembly step has been completed. In contradistinction to this, the right-hand graph of FIG. 4 with reference to the prior art methods, indicates that the axial force applied during the pre-assembly step corresponds approximately to the axial force occurring at one revolution of the nut and that, during the final assembly step, a considerable torque increase can be applied by the operative with the cutting ring teeth continuing to cut into the pipe thus giving rise to the risk of over-tightening during the final assembly step thereby potentially adversely affecting the final connection due to plastic deformation of the pipe.

On the other hand, it happens frequently that the nut is insufficiently tightened during the final assembly step as this cannot be recognized by the operative in the methods of the prior art. As mentioned above, the problem of overtightening or undertightening is overcome by the method of the invention as the operative can recognize immediately the substantial increase in required applied torque as indicated in the right-hand graph of FIG. 3.

Figure 5:
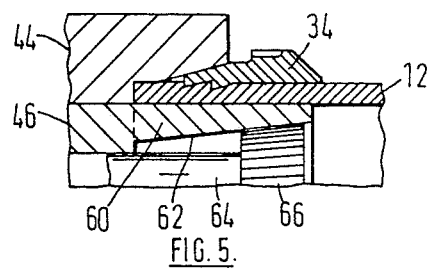
FIG. 5 is a side cross sectional view similar to that of FIG. 1 but showing a modified from of pre-assembly member having a radially outwardly displaceable support journal for the pipe.

In FIG. 5 of the drawings there is shown a modified form of pre-assembly body member 44 which is hollow and wherein the journal 46 is hollow and is axially slit to provide a plurality of axially extending fingers 60 defining a cylindrical outer surface and a frusto conical inner surface 62. A journal of this type permits the insertion therethrough of a mandrel 64 having a frusto conical head 66 for displacing the fingers 60 radially outwardly thereby enabling them to be brought into firm supporting engagement with the interior of the pipe 12 during the pre-assembly step.

Figure 6:
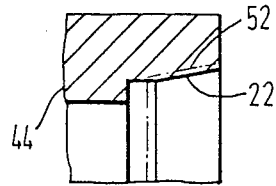
FIG. 6 is a side cross sectional view showing the relationship between, the entry bore dimensions of the pre-assembly body member and the connector body according to an embodiment of the invention different from that shown in FIG. 2.

An alternatively dimensioned pre-assembly body member 44 is shown in FIG. 6 wherein the axial distance from the entry end of the entry bore 52 (shown in dotted line) to the annular stop shoulder 48 is substantially identical with the corresponding distance from the entry end of the entry bore 22 to the annular stop shoulder 26 of the connector body (in FIGS. 1 and 2, this axial distance is less in the pre-assembly body member than in the connector body by the distance X). In FIG. 6, the angle of conicity of the entry bore 52 of the pre-assembly body member is substantially identical with the angle of conicity of the entry bore 22 of the connector body but the diameter of the pre-assembly body member entry bore 52 is greater than the diameter of the connector body entry bore 22. Thus, during the final assembly step, although the axial distances of penetration of the clamping ring 34 and end portions of the pipe 12 into the entry bores of the pre-assembly body member and the connector body are the same, sealing engagement between the leading frusto conical surface 36 of the clamping ring 34 and the connector body entry bore 22 is permitted due to the clamping ring leading frusto conical surface being of a greater diameter (as determined by the diameter of the bore 52 during the pre-assembly step) than that of the connector body entry bore whereby further cutting of the clamping ring teeth 40 into the pipe 12 is prevented but radially inward deformation of the pipe is permitted.

I claim:

1. A method of securing a connector to a first end of an axially elongated pipe having a uniform diameter outside surface, the connector comprises a body having an axially extending frusto-conical entry bore having an angle of conicity axially alignable with the pipe, a clamping ring having radially inwardly directed cutting teeth for engaging the outside surface of the pipe adjacent the first end thereof and having an outer frusto-conical surface sealingly engageable with the entry bore of the body and an angle of conicity corresponding to the angle of conicity of the connector, and a retainer ring engageable with the body and the clamping ring for securing the pipe to the body; the method comprising a pre-assembly operation and a final assembly operation wherein the pre-assembly operation comprises the steps of locating the clamping ring around an end portion of the pipe adjacent to and spaced axially from the one end of the pipe and axially pressing the clamping ring and the first end of the pipe into a frusto-conical entry bore of a pre-assembly body member having an angle of conicity corresponding to the angle of conicity of the connector with an$_a$axial force sufficient for cutting the teeth of the clamping ring into engagement with the pipe and for contacting the first end of the pipe with a stop surface in the pre-assembly body member with the stop surface extending transversely of the axis of the pipe with by turning the retaining ring 1.5 turns thereby causing the clamping ring to move an axial distance inserting a support member on the pre-assembly body member axially into the pipe into the axially extending region of the cutting teeth on the clamping ring for maintaining the first end of the pipe free of deformation transverse to the axial direction thereof while cutting the teeth into the pipe, and removing the pre-assembly body member from the pipe for completing the pre-assembly operation, the final assembly operation comprises the steps of inserting the pipe and attached clamping ring into the entry bore of the connector body and applying an axial force to the clamping ring by engagement of the retainer ring with the body so that the axial force is less than the axial force applied to the clamping ring during the pre-assembly steps for preventing further cutting of the clamping ring teeth into the pipe while permitting radially inward deformation of the pipe and applying the axial force only until an increase in torque is apparent.

* * * * *